United States Patent
Asari et al.

(10) Patent No.: US 7,428,333 B2
(45) Date of Patent: Sep. 23, 2008

(54) VISIBILITY IMPROVEMENT IN COLOR VIDEO STREAM

(75) Inventors: Vijayan K. Asari, Virginia Beach, VA (US); Li Tao, Norfolk, VA (US)

(73) Assignee: Old Dominion University, Norfolk, VA (US)

( * ) Notice: Subject to any disclaimer, the term of this patent is extended or adjusted under 35 U.S.C. 154(b) by 503 days.

(21) Appl. No.: 11/041,463

(22) Filed: Jan. 24, 2005

(65) Prior Publication Data

US 2005/0163393 A1 Jul. 28, 2005

Related U.S. Application Data

(60) Provisional application No. 60/538,999, filed on Jan. 23, 2004.

(51) Int. Cl.
*G06K 9/00* (2006.01)
(52) U.S. Cl. ............... 382/167; 358/518; 348/254; 345/77
(58) Field of Classification Search ............ 382/169, 382/205, 274, 100, 162, 168, 254, 272, 273, 382/167; 348/251.254, 217.1, 216.1, 301, 348/251, 254; 345/20, 63, 77, 581–618, 345/690–697; 358/516, 519, 461, 518
See application file for complete search history.

(56) References Cited

U.S. PATENT DOCUMENTS

| | | | | |
|---|---|---|---|---|
| 4,731,865 A | * | 3/1988 | Sievenpiper | ............. 382/274 |
| 6,317,157 B1 | * | 11/2001 | Takayama | ............. 348/441 |
| 6,741,753 B1 | * | 5/2004 | Moroney | ............. 382/274 |
| 6,885,482 B1 | * | 4/2005 | Kubo et al. | ............. 358/518 |
| 2004/0120599 A1 | * | 6/2004 | Henley | ............. 382/274 |

* cited by examiner

*Primary Examiner*—Anand Bhatnagar
(74) *Attorney, Agent, or Firm*—Williams Mullen; M. Bruce Harper

(57) ABSTRACT

A new image enhancement process based on an integrated neighborhood dependent nonlinear approach for color images captured in various environments such extremely low lighting, fog or underwater. The new process is a combination of two independent processes: luminance enhancement and contrast enhancement. The luminance enhancement, also regarded as a process of dynamic range compression, is essentially an intensity transformation based on a specifically designed nonlinear transfer function, which can largely increase the luminance for dark regions of the image but only slightly change the luminance for the bright regions of the image. The contrast enhancement transforms each pixel's intensity based on the relationship between the pixel and its surrounding pixels. The output of the contrast enhancement is a power function of the luminance of the input image. The exponent of the power function is determined by the information obtained in the original luminance image, which is the ratio between the result of neighborhood averaging and the luminance of the center pixel. After contrast enhancement, the luminance image is converted back to a color image through a linear color restoration process with color saturation and hue adjustment.

6 Claims, 3 Drawing Sheets

US 7,428,333 B2

VISIBILITY IMPROVEMENT IN COLOR VIDEO STREAM

CROSS REFERENCE TO RELATED APPLICATIONS

The present application claims priority from U.S. Provisional Application Ser. No. 60/538,999, filed Jan. 23, 2004.

BACKGROUND OF THE INVENTION

1. Field of the Invention

The invention relates to digital image enhancement process and more particularly to a process for enhancing digital video.

2. Description of Related Art

The most common image enhancement techniques include histogram equalization, dynamic range stretching, gamma adjustment, logarithmic enhancement, as well as others. Histogram equalization is a process of adjusting the image so that each intensity level contains an equal number of pixels. In many cases, this can improve the appearance of the image by balancing light and dark areas. Other times, it degrades the image's appearance by accentuating image defects. This is particularly true with JPEGs.

Gamma adjustment is a method of tonal correction that takes the human eye's perception of neighboring values into account. Gamma adjustment balances the shadows and highlights in an image by keeping black as black and white as white, but making a non linear transition between the two. Gamma can be used to make shadows less deep, or highlights less washed out.

Logarithmic enhancement relies on a logarithmic scale to enhance images rather than a linear scale because the human eye has a logarithmic intensity response while some images are digitized by equipment that quantizes the samples on a linear scale. To make the image better for use by a human observer, these images may be made to have a logarithmic response.

Previous patents in this field include U.S. Pat. No. 6,580,835 to Gallagher which improves digital images by performing a normalized tone scale conversion based on a central pixel of the image.

U.S. Pat. No. 5,991,456 to Rahman et al. describes a method for improving a digital image which calculates the image intensity at specified positions and adjusts the image intensity according to a mathematical equation. The process described in the Rahman patent is also know as "Multi-Scale Retinex."

U.S. Pat. No. 5,640,469 to Lewins et al. describes a method for improving images obtained from infrared or x-ray systems which do not obtain the image using visible light. The method improves the intensity equalization of the obtained image data.

An object of the present invention is to provide a method for enhancing digital images.

Another object of the present invention is to provide a method for enhancing digital images captured in dark, foggy or underwater environments.

Another object of the present invention is to provide a method for enhancing digital images which enhances the luminance and color in separate steps.

Another object of the present invention is to provide a method for enhancing digital images which enhances the luminance of the image by increasing the brightness of dark portions of the image more significantly than the bright areas of the image.

Yet another object of the present invention is to provide a method for enhancing digital images which is capable of enhancing digital video streams in real time.

Finally, it is an object of the present invention to accomplish the foregoing objectives in a simple and cost effective manner.

SUMMARY OF THE INVENTION

The present invention addresses these needs by providing a method for improving a digital image. The digital image is converted to a luminance image. The luminance of each pixel of the image is then enhanced by increasing the intensity of darker pixels to a greater extent than lighter pixels. The contract of the image is then enhanced. Finally, the luminance image is transformed back into a color image.

BRIEF DESCRIPTION OF THE DRAWINGS

A more complete description of the subject matter of the present invention and the advantages thereof, can be achieved by the reference to the following detailed description by which reference is made to the accompanying drawings in which.

DETAILED DESCRIPTION OF THE PREFERRED EMBODIMENT

Figure 1:
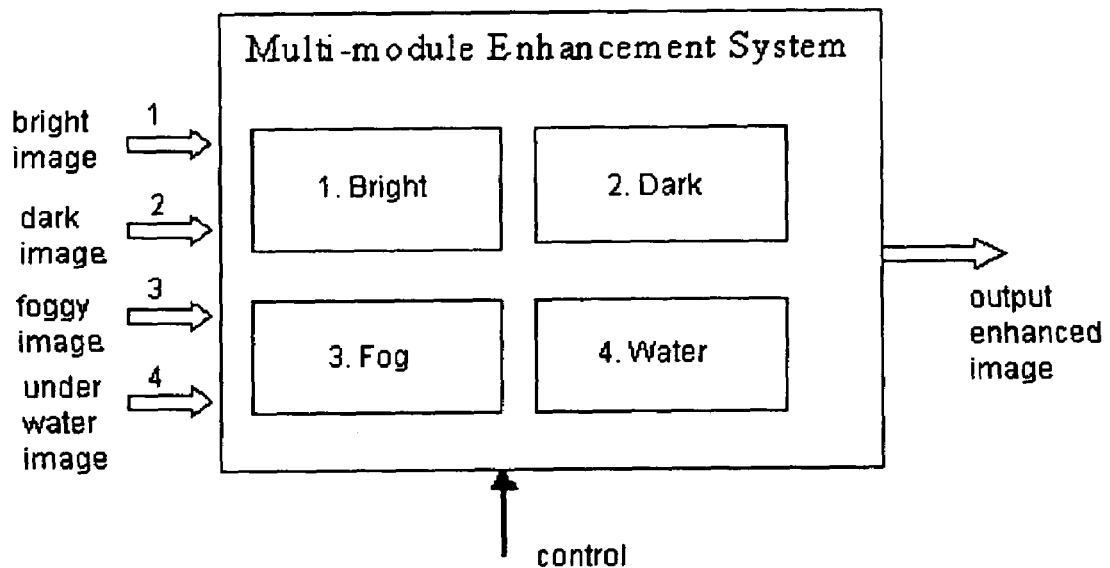
FIG. 1 is a schematic view of the system in which the novel image processing process is carried out. The process consists of multiple modules for processing images.

The following detailed description is of the best presently contemplated modes of carrying out the invention. This description is not to be taken in a limiting sense, but is made merely for the purpose of illustrating general principles of embodiments of the invention.

Dynamic range compression can be realized by employing a non-linear transfer function, which increases the luminance of the dark regions while keeping the luminance level of the brighter regions. In this method, a new transfer function is used to enhance an image's luminance in the first step. This transfer function can be automatically adjusted to achieve appropriate luminance enhancement. The contrast of the enhanced image will be degraded and images will appear grayed-out after the first step because the luminance enhancement of the bright regions of the image is relatively less than that of the dark regions. Therefore, applying luminance enhancement alone is not sufficient to improve the overall quality of the images.

An additional process must be applied to restore or even enhance the contrast information from the original image. However, the normal contrast enhancement technique, which is based on the luminance information of the pixels being processed, is something similar to the opposite of the dynamic range compression. It simply increases the luminance for bright pixels and decreases the luminance for the dark pixels. As a result, the dynamic range can be significantly expanded. On the other hand, this simple method has limited performance for bringing out fine details where adjacent pixels have small luminance differences because the surrounding pixels are not considered when one pixel is being processed. In general, the normal contrast enhancement method is not usable with the dynamic range compression for the purpose of image enhancement.

Therefore, an adaptive process, which includes considering the effect of surrounding pixels, should be applied to enhance the image's contrast after the dynamic range compression. While an image is processed with such a method, pixels with the same luminance can have different outputs depending on their neighborhood pixels. When surrounded by darker or brighter pixels, the luminance of the pixel being processed (the center pixel) will be boosted or lowered respectively. In this way, picture contrast and fine details can be optimally enhanced while dynamic range expansion can be controlled without degrading image quality. The luminance information of surrounding pixels is obtained by using 2D discrete spatial convolution with a Gaussian kernel, which in essence is one type of neighborhood averaging. A Gaussian kernel is used because of the visual process of human eyes. The standard deviation (also called scale) of the 2D Gaussian distribution determines the size of averaging neighborhood. A convolution with a small scale, such as several pixels, can provide luminance information about the nearest neighborhood pixels, while the convolution with a large scale comparable to the image dimensions can produce a result about the large-scale luminance variation over the whole image. Obviously, convolutions with multiple scales can provide more complete information on the image's luminance distribution, and hence lead to more balanced image enhancement. If faster processing time or a certain special effect is wanted, a single-scale convolution may be used. For example, a medium scale convolution can provide a trade-off effect between a small and a large-scale convolution. Generally, processing with smaller scale convolutions tends to enhance local contrast or fine details, larger scale convolutions can provide global tonality for better contrast and smoother results, and a medium scale can provide a mixture of detail and image rendition.

After the surrounding luminance information is obtained by 2D convolution, the center pixel's luminance is compared with the convolution result. These two transactions are both carried out on the original image. If the center pixel's luminance is higher than the surrounding pixels, the corresponding pixel on the luminance-enhanced image will be pulled up; otherwise it will be pulled down. As a result, the contrast of the luminance-enhanced image can be improved. Here, a new exponential neighborhood determined calculation is used to implement the contrast enhancement process at the second stage. The details of this process will be described in further detail below. In order to obtain more balanced and more natural results, multi-scale convolutions are preferred since it can provide better contrast enhancement for bringing out more image features. For color images, when luminance and contrast enhancements have been completed, the color restoration process is applied to convert the output from luminance space back to color space. This conversion is a linear process based on the relationship between the spectral band and the luminance of the original image, and this color restoration can also adjust the color hue of the enhanced image. Finally, color saturation adjustment is applied to produce more natural output color by automatically compensating or suppressing the original color saturation in each band.

In order to apply different enhancement steps based on different types of input images, particularly, dark, bright, foggy or under-water images, a multi-module image enhancement system, which preferably is provided which consists of four different modules. All four modules are based on the same enhancement system, and these enhancement steps can be applied as needed.

As shown in FIG. 1, the four preferred enhancement modules are:

Module 1: Bright input image.

Directly output the image without any enhancement operation.

Module 2: Dark input image

Apply 'INDANE' process for nonlinear enhancement.

Module 3: Foggy input image.

Apply 'Histogram Equalization' process for 'foggy' images.

Module 4: Underwater input image.

Apply 'Histogram Equalization' process for 'underwater' images.

Theory of Operations

First, color images in the RGB color space are converted to luminance (intensity) images using the standard procedure defined in the following formula $$I(x, y) = \frac{(IR(x, y) \cdot 76.245 + IG(x, y) \cdot 149.685 + IB(x, y) \cdot 29.07)}{255} \quad (1)$$

where I(x, y), IR(x, y), IG(x, y), and IB(x, y) represent the luminance and R, G, B values respectively for the pixel with index (x, y). I(x, y) is then normalized (for example, divided by 225 for images with 8-bit color depth) as $$I_n(x, y) = \frac{I(x, y)}{255} \quad (2)$$

where the subscript n denotes a normalized value for the luminance intensity, and the index 'x' and 'y' denote pixel location based on an x-y orthogonal or cartesian coordinate system.

The normalized luminance $I_n(x,y)$ is transformed by applying the new pixel transfer function defined below $$I_n' = \frac{(I_n^{0.4} + (1 - I_n) \cdot 0.5 + I_n^2)}{2} \quad (3)$$

Figure 2:
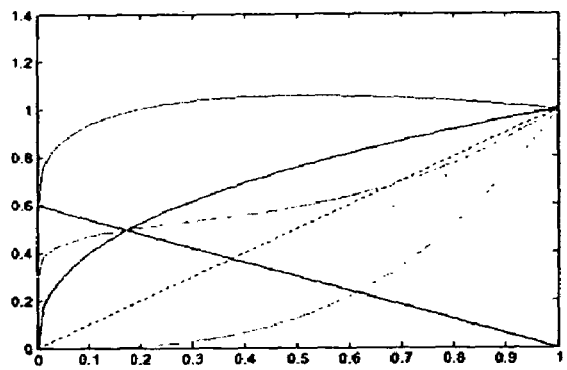
FIG. 2 shows a graphical representation of the transfer function for luminance enhancement.

This transfer function is actually a combination of three simpler functions and it is graphically shown in FIG. 2.

The transfer function is actually a combination of three simple mathematic functions and it is graphically shown as the red curve in the graph with a blue straight line for comparison, which in fact represents the identity transformation. The first two terms in Eq. (2) are plotted as the yellow and black curves, respectively, and the summation of these two curves yields the green line. The last term in Eq. (2) is shown in the graph as the orange curve. The addition of the green and the orange curves after normalization (division by 2 in Eq. 2) finally produces the transfer function. It can be easily seen that this transformation can largely increase the luminance for those dark pixels (regions) while brighter pixels (regions) have lower or even negative enhancement. In this way, the nonlinear transfer function has a flexible enhancement mechanism which can prevent luminance drop for pixels in the brighter region but enhance the darker region. It should be pointed out that this mechanism is intentionally designed for the purpose of luminance enhancement and can provide appropriate dynamic range compression from which optimal results can be obtained through a contrast enhancement process. The constant 0.5 in Eq. (3) can be adjusted manually based on the overall luminance level I (x,y) of the input image so that the luminance enhancement can be finely tuned to achieve optimal results.

Next, 2D discrete convolution is carried out on the original luminance image I(x, y) by using a Gaussian function as the convolution kernel. The Gaussian function G(x, y) for the convolution has a form like $$G(x, y) = K \cdot e^{\left(\frac{-(x^2+y^2)}{c^2}\right)} \quad (4)$$

where K is determined by $$\int\int K \cdot e^{\left(\frac{-(x^2+y^2)}{c^2}\right)} \cdot dx dy = 1 \quad (5)$$

and C is the scale (standard deviation) or Gaussian surround space constant. The convolution can be expressed as $$I'(x, y) = I(x, y) * G(x, y) \quad (6)$$

Since the convolution in spatial domain is time consuming, it is converted to a multiplication in frequency domain, which is much faster. First, I(x, y) and G(x, y) are transformed using 2D FFT. Then, multiplication of both quantities in frequency domain is performed. Finally, the product is transformed back to spatial domain as I'(x, y) using 2D inverse FFT. The convolution result I'(x, y) contains the luminance information of neighboring pixels. It is compared with the center pixel for the contrast enhancement process, which is described in the expression below $$R(x, y) = 255 \cdot I_n'(x, y)^{r(x,y)} \quad (7)$$

where the exponent $r(x, y) = I'(x, y)/I(x, y)$. In this way, the contrast of the image produced from the first step is enhanced because the pixel surrounded by darker pixels will be enhanced for r(x, y)<1, and the luminance of the pixel surrounded by brighter pixels will be even lower for r(x, y)>1. Here, the exponent r(x, y) is based on the original luminance image I(x, y) and its low pass filtered result I'(x, y), instead of using the ratio from the luminance enhanced image $I_n'(x, y)$ and its low pass filtered result. It is because the contrast information in the luminance enhanced image has been changed and degraded during the nonlinear luminance enhancement process. For better results of image enhancement, contrast enhancement is performed with multiple convolution results from different scales. The final output is a linear combination of the contrast enhancement results based on multiple scales. This process may be described by the following equations $$G_i(x, y) = K \cdot e^{\left(\frac{-(x^2+y^2)}{c_i^2}\right)} \quad (8)$$

$$I_i'(x, y) = I(x, y) * G_i(x, y) \quad (9)$$

$$r_i(x, y) = \frac{I_i'(x, y)}{I(x, y)} \quad (10)$$

$$R_i(x, y) = 255 \cdot I_n'(x, y)^{r_i(x,y)} \quad (11)$$

$$R(x, y) = \sum_i w_i R_i(x, y) \quad (12)$$

where $c_i$ (i=1, 2, 3, ...) represents different scales and $w_i$ is the weight factor for each contrast enhancement output $R_i(x, y)$. Based on image enhancement experiments, a choice of three scales is reasonable for enhanced images having a well-balanced and natural visual effect. Both fine details and overall tonality can be accounted for in the output images processed by 3-scale convolutions. In this method, the three scales used are 5, 20 and 240. Both luminance and contrast enhancements are performed in the luminance space. The enhanced color image can be obtained through a linear color restoration process based on the chromatic information contained in the input image. Mathematically, the color restoration process for images in RGB color space can be expressed by the equations given below $$R_j(x, y) = R(x, y) \frac{I_j(x, y)}{I(x, y)} \cdot \lambda \quad (13)$$

where j=r, g, b represent the R,G,B spectral band respectively, and $R_r$, $R_g$ and $R_b$ are the enhanced RGB values of the enhanced color image. A parameter λ is used to adjust the color hue of the three spectral bands. λ is a flexibly adaptive constant between 0 and 1 which can be different in different spectral bands. The output color images produced by the color restoration process usually look somewhat unnatural in color saturation and tonality. However, they can be refined through a color saturation and white balance adjustment, achieved according to the following equations.

$$R_r'(x, y) = H_r[R_r(x, y) + s(R_a(x, y) - R_r(x, y))] \quad (14)$$

$$R_g'(x, y) = H_g[R_g(x, y) + s(R_a(x, y) - R_g(x, y))]$$

$$R_b'(x, y) = H_b[R_b(x, y) + s(R_a(x, y) - R_b(x, y))]$$

$$\text{where } R_a(x, y) = \frac{R_r(x, y) + R_g(x, y) + R_b(x, y)}{3}$$

The terms in the square brackets are used for color saturation adjustment by tuning the constant s that is usually in the range of 0.1-0.2 for most pictures. Coefficients $H_r$, $H_g$ and $H_b$ are introduced to control the intensity of each spectral band for white balance correction. Those parameters need to be manually determined based on the input image properties. In our experiments, we chose $H_r$=0.2, $H_g$=0.3, and $H_b$=0.3. Color saturation is realized by comparing the intensity of each pixel of each band and the average color value of that pixel. If the former one is less than the latter one, the value of the intensity in that band is compensated. If the case is on the contrary, the value of the intensity in that band is suppressed.

Experimental Results and Discussion

This image enhancement method has been applied to process many digital images taken by digital cameras under varying lighting conditions. The enhanced images generally have a good quality, with fine details, well-balanced contrast and luminance across the whole image, and generally have natural color rendition. This image enhancement method allows for various adjustable parameters, which can be finely tuned to achieve optimal results for different types of images. Some of the parameters may also be set based on the properties of the input images. Thus the method can be adaptive, requiring fewer manual adjustments. Based on the image processing experiments, the method will be thoroughly analyzed and discussed. The current method is also compared to the method disclosed in U.S. Pat. No. 5,991,456 or the "Multi-Scale Retinex" (MSR) method.

Unlike MSR in which each spectral band is individually processed, the instant image enhancement process is only implemented to treat the luminance image although it can also be used to process each band respectively. It is based on the fact that image enhancement is virtually a nonlinear process that may produce results which cannot be predicted from the original image. For instance, individual processing of each band may cause the enhanced image to look unnatural by significantly changing the color rendition of the input image or by adding irrelevant colors into the image. Due to these problems, the current method uses a weighted average approach to obtain the luminance information of an RGB color image, and then a process (INDANE) is applied based on the luminance image instead of every spectral band. In order to bring out the details in the dark regions of the image, a nonlinear transformation in luminance space is performed on all pixels of the luminance image using a specifically designed transfer function. In this step, only luminance enhancement is implemented, which is separated from the contrast enhancement process in the next step. Therefore, both processes become two independent steps while in MSR both processes are performed simultaneously. The separation of the two processes is believed to provide an easier and more flexible way to tune the image enhancement process, which has been demonstrated.

The 2D multi-scale spatial convolution is a useful technique for extracting the information of surrounding pixels. Moreover, image enhancement based on multiple convolutions with different scales can provide high-quality images with natural and well-balanced visual effect. Convolutions with small scales can help bring out fine details while large-scale convolutions are able to produce a tonality close to that of the original image.

Figure 3:
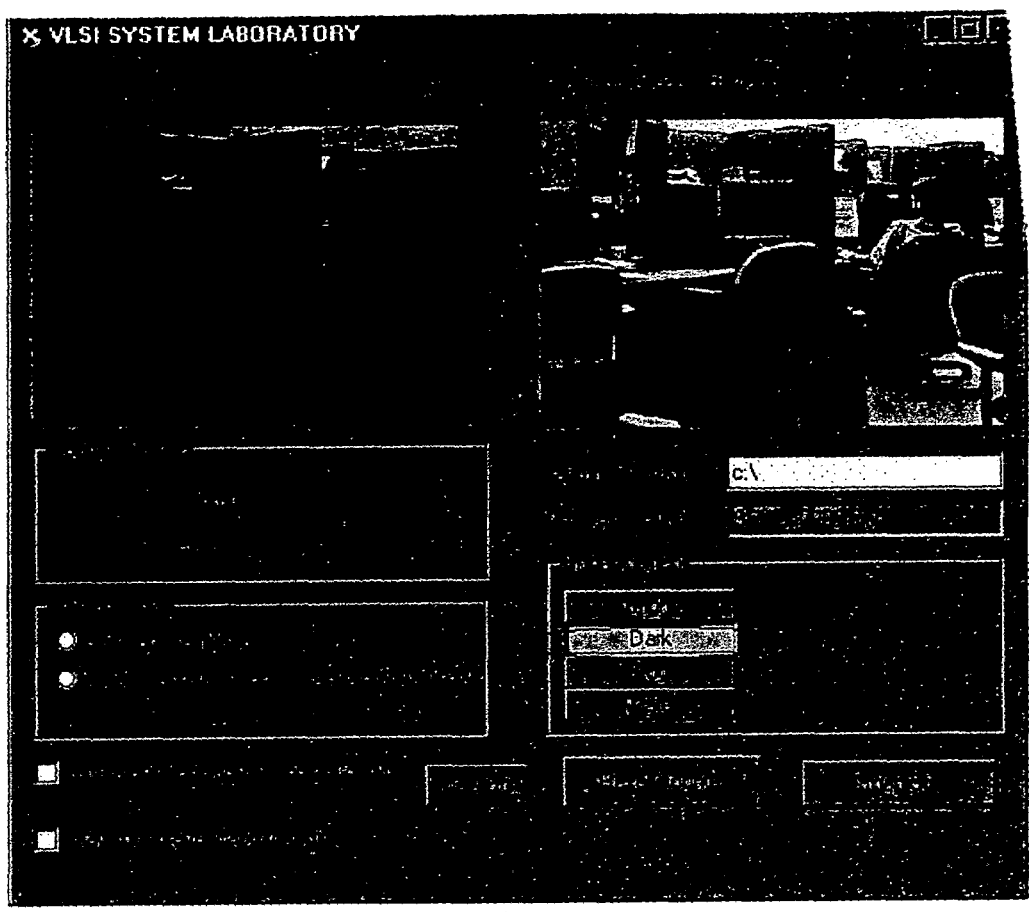
FIG. 3 shows a pixel in the RGB color space.
Figure 4A:
FIG. 4a shows a dark image prior to enhancement.
Figure 4D:
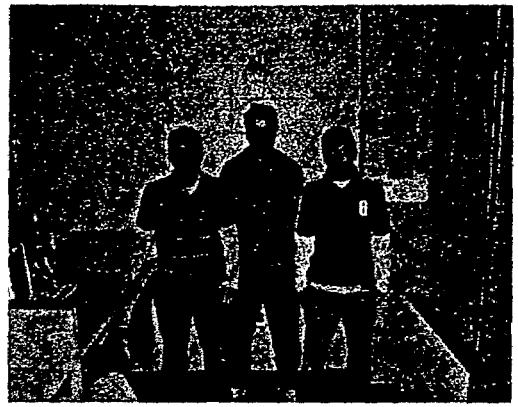
FIG. 4d shows a dark image subsequent to enhancement.
Figure 4B:
FIG. 4b shows a foggy image prior to enhancement.
Figure 4E:
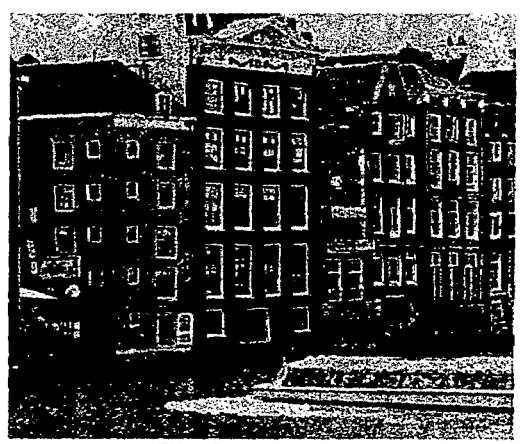
FIG. 4e shows a foggy image subsequent to enhancement.
Figure 4C:
FIG. 4c shows an underwater image prior to enhancement.
Figure 4F:
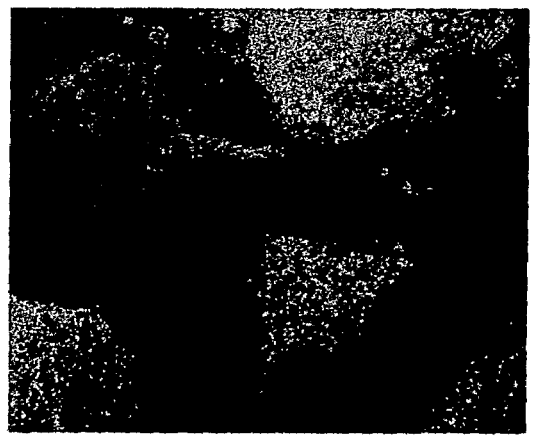
FIG. 4f shows an underwater image subsequent to enhancement.

The process may be implemented in C++ and the module can enhance color image frames of size 640×480 pixels from video sequences at a rate of 5 frames per second in an HP Pavilion Zd7000 machine with Intel Pentium 4 Hyper-threading processor at 3.06 GHz clock. As shown in FIG. 3, the process is applied to images which are taken in three different environments, namely, dark, foggy and underwater images. The results of the enhancement process are shown in FIGS. 4a through 4f. FIGS. 4a-4c are images taken in dark, foggy and underwater environments, respectively. FIGS. 4d-4f show the same images, respectively, after enhancement.

Many improvements, modifications, and additions will be apparent to the skilled artisan without departing from the spirit and scope of the present invention as described herein and defined in the following claims.

What is claimed is:

1. A method for enhancing a digital image, comprising:
providing a color digital image consisting of a plurality of pixels;
converting the color digital image to a luminance image, wherein the color digital image is converted to a luminance image by:
calculating the luminace value for each pixel accroding to:

$$I(x, y) = \frac{(IR(x, y) \cdot 76.245 + IG(x, y) \cdot 149.685 + IB(x, y) \cdot 29.07)}{255}$$

where I(x, y), represents the overall luminance value, IR(x, y), IG(x, y), and IB(x, y) represent the R, G, B, luminance values repectively, for a pixel with index (x, y); and
normalizing the luminance values;
enhancing the luminance image by increasing the intensity of at least one darker pixel of the image;
and restoring the luminance image to an enhanced color digital image.

2. The method as set forth in claim 1 further comprising, prior to restoring the luminance image to an enhanced color digital image:
enhancing the contrast of the luminance image.

3. The method as set forth in claim 1 wherein the luminance values are normalized in accordance with $$I_n(x, y) = \frac{I(x, y)}{255}$$

where I(x, y) represents the luminance value for a pixel with index (x, y) and $I_n(x, y)$ represents the normalized luminance value.

4. The method of claim 1 in which the luminance image is enhanced by
for each pixel, obtaining the luminance information of a plurality of pixels adjacent to that pixel;
for each pixel, enhancing the luminance of that pixel based on the luminance information of the adjacent pixels.

5. The method as set forth in claim 4 wherein for each pixel, the luminance information of the plurality of pixels adjacent to that pixel is obtained according to I'(x, y)=I(x, y)*G(x, y), where I(x, y) represents the luminance value for a pixel with index (x, y),
and I'(x, y) represents the convolution luminance value, and G(x, y) represents the Gaussian function.

6. The method as set forth in claim 1 wherein for each pixel, the luminance of that pixel is enhanced based on the luminance information of the adjacent pixels according to $$R(x, y) = 255 \cdot I_n'(x, y)^{r(x, y)}$$

where the exponent r(x, y)=I'(x, y)/I(x, y), and I(x, y) represents the luminance value for a pixel with index (x, y), I'(x, y) represents the convolution luminance value, $I_n'(x, y)$ represents the covolution normalized value, and R(x, y) represents the contrast enhancement output.

* * * * *